United States Patent Office 3,049,433
Patented Aug. 14, 1962

3,049,433
STABILIZED CELLULOSE DERIVATIVES
AND PROCESS
Robert W. Butler, Wilmington, Del., assignor to Hercules Powder Company, Wilmington, Del., a corporation of Delaware
No Drawing. Filed Mar. 21, 1960, Ser. No. 16,168
7 Claims. (Cl. 106—177)

The present invention relates to cellulose derivatives of improved resistance to becoming discolored and to a process of preparing same, and more particularly to water-soluble cellulose ethers of improved resistance to becoming discolored, particularly at elevated temperature, and to a process of preparing same.

Although, as will be shown and described hereinafter more fully, the present invention is applicable to cellulose derivatives, for the sake of clarity and simplicity the invention will be described herein for the most part with reference to hydroxyethyl cellulose. As a matter of brevity hydroxyethyl cellulose is sometimes referred to herein as HEC, carboxymethylcellulose as CMC and carboxymethyl hydroxyethyl cellulose as CMHEC.

"Discoloring" or equivalent terminology is used herein to mean changing from substantially colorless to colored as well as changing to a darker shade of color.

There is a large and widespread use of hydroxyethyl cellulose in polyvinyl acetate and other synthetic latexes as well as in water-based paints. These paints are often subjected to high temperature during preparation or in use or both. For example, ceiling tile is often baked at elevated temperature for short periods after painting with a latex paint. Sometimes paints become exposed to high temperatures after application as occurs with painted surfaces which have glass between them and the sun. Discoloration is usually more objectionable in white or pastel shades.

An object of the present invention is to eliminate or minimize the discoloration of cellulose derivatives. A further object is to eliminate or minimize the discoloration of water-soluble cellulose ethers. A still further object is to eliminate or minimize the discoloration of water-soluble cellulose ethers, particularly at elevated temperature. Another object is to provide cellulose derivatives, particularly water-soluble cellulose ethers, which are stabilized against discoloration especially at elevated temperature. These and other objects will be apparent from the description of this invention given hereinafter.

The above and other objects are accomplished according to this invention by carrying out the process which comprises incorporating in cellulose derivatives a stabilizer compound selected from the group consisting of monosodium phosphate, disodium phosphate, calcium chloride, magnesium sulfate, potassium citrate, monopotassium phosphate, magnesium p-toluene sulfonate, aluminum sulfate, barium chloride, calcium nitrate and magnesium chloride.

The following examples illustrate specific embodiments of this invention, but they are not intended to limit the invention to any greater extent than do the claims of this application. In these examples the cellulose derivative and stabilizer were mixed together in the form of aqueous solutions of each, the mixture was adjusted to within the pH range normally used in many commercial applications where these cellulose derivatives are employed, and films were cast from the mixture and dried. An accelerated and quite severe heat stability test was made by baking the films at elevated temperature. Then the films were visually matched for color with the films given in the color rating chart below. The heat stability test is at least as severe as encountered in commercial use. All films were substantially colorless before baking. All percentages herein are by weight. The percent stabilizer is by weight of the cellulose derivative and both are on a dry basis.

In order to have a reasonably accurate guide the following color rating chart was prepared. This chart was prepared by taking a large number of cellulose ether samples in the form of films two mils thick on glass plates and selecting from them the particular samples which from visual observation appeared to best represent all shades of color in the entire group of samples. The selected samples were then arranged in order of decreasing color as visually determined and given a descriptive word color designation. Next the percent light transmission through each of the selected films was determined.

The following chart gives further details.

COLOR RATING CHART

| Descriptive word color designation: | Percent light transmission |
|---|---|
| Very dark brown | 30 |
| Dark brown | 50 |
| Light brown | 67 |
| Light tan | 72 |
| Very light tan | 85 |
| Slight tint | 87 |
| Substantially colorless | 89 |

*Examples 1–18 (Table 1).—Stabilized HEC*

The indicated amount of stabilizer as a 2.5% aqueous solution thereof was mixed with a 6% aqueous solution of HEC. The pH of the mixture was adjusted to within the range of about 5–8. A film about 2 mils thick when dry was made from the resulting mixture by casting it on a glass plate and drying 20 minutes at 221° F. The dry film was baked 20 minutes at 400° F.

The HEC used was prepared by the conventional slurry process wherein an aqueous alcoholic slurry of cellulose material is contacted with sodium hydroxide, the alkali cellulose etherified with ethylene oxide, the excess sodium hydroxide neutralized with acid, and the HEC washed and dried. The HEC had an MS of about 2.5 and a viscosity of about 100 cps. at 5% solids concentration. MS is the moles of etherifying agent (e.g., alkylene oxide) substituted per anhydroglucose unit of the cellulose molecule and is determined by the familiar Zeisel-Morgan method.

Further details are given in Table 1 which follows.

TABLE 1 (EXAMPLES 1–18).—STABILIZED HEC

| Ex. No. | Stabilizer Name | Percent | pH of final solution | pH adjusted with— | Film color after baking |
|---|---|---|---|---|---|
| 1 | None | None | 6.7 | None | Very dark brown. |
| 2 | ___do___ | None | 6.0 | H₃PO₄ | Do. |
| 3 | NaH₂PO₄.H₂O | 0.5 | 6.0 | H₃PO₄ | Do. |
| 4 | NaH₂PO₄.H₂O | 1.0 | 6.0 | H₃PO₄ | Dark brown. |
| 5 | NaH₂PO₄.H₂O | 2.5 | 6.0 | HCl | Do. |
| 6 | NaH₂PO₄.H₂O | 5.0 | 6.0 | HCl | Light brown. |
| 7 | NaH₂PO₄.H₂O | 10.0 | 5.8 | None | Slight tint. |
| 8 | Na₂HPO₄.H₂O | 2.5 | 6.0 | HCl | Dark brown. |
| 9 | Na₂HPO₄.H₂O | 5.0 | 6.0 | H₃PO₄ | Very light tan. |
| 10 | MgSO₄ | 2.5 | 6.0 | HCl | Light tan. |
| 11 | MgSO₄ | 5.0 | 6.0 | H₂SO₄ | Do. |
| 12 | MgSO₄ | 10.0 | 6.0 | H₂SO₄ | Very light tan. |
| 13 | CaCl₂.2H₂O | 5.0 | 6.0 | HCl | Light tan. |
| 14 | KH₂C₆H₅O₇ | 5.0 | 5.1 | None | Light brown. |
| 15 | ZnCl₂ | 5.0 | 6.0 | HCl | Dark brown. |
| 16 | ZnCl₂ | 10.0 | 6.0 | HCl | Light brown. |
| 17 | (NH₄)₂SO₄ | 5.0 | 6.0 | H₂SO₄ | Do. |
| 18 | Al₂(SO₄)₃.18H₂O | 5.0 | 6.0 | NaOH | Dark brown. |

*Examples 19–32 (Table 2)*

These examples were carried out in substantially the same manner as Examples 1–18 above using another lot of HEC. Although this lot of HEC was prepared in essentially the same way and had the same viscosity as that used in Examples 1–18, the degree of color formation was less in this unstabilized HEC.

Further details are given in Table 2 which follows.

TABLE 2 (EXAMPLES 19–32)

| Ex. No. | Stabilizer | | pH of final solution | pH adjusted with— | Film color after baking |
|---|---|---|---|---|---|
| | Name | Percent | | | |
| 19 | None | None | 5.8 | None | Light brown. |
| 20 | ----do---- | None | 6.0 | NaOH | Do. |
| 21 | NaH$_2$PO$_4$.H$_2$O | 0.5 | 6.0 | NaOH | Light tan. |
| 22 | NaH$_2$PO$_4$.H$_2$O | 1.0 | 6.0 | NaOH | Very light tan. |
| 23 | NaH$_2$PO$_4$.H$_2$O | 2.5 | 6.0 | HCl | Slight tint. |
| 24 | MgSO$_4$ | 5.0 | 6.0 | NaOH | Very light tan. |
| 25 | KH$_2$PO$_4$.3H$_2$O | 5.0 | 6.0 | NaOH | Slight tint. |
| 26 | MPTS [1] | 5.0 | 6.0 | NaOH | Very light tan. |
| 27 | Al$_2$(SO$_4$)$_3$.18H$_2$O | 5.0 | 6.0 | NaOH | Slight tint. |
| 28 | Ba(Cl$_2$)$_2$.2H$_2$O | 5.0 | 6.0 | None | Light tan. |
| 29 | Ca(NO$_3$)$_2$ | 5.0 | 6.0 | ---do--- | Very light tan. |
| 30 | MgCl$_2$6H$_2$O | 5.0 | 6.0 | ---do--- | Do. |
| 31 | None | None | 8.0 | NaOH | Light brown. |
| 32 | NaH$_2$PO$_4$.H$_2$O | 10.0 | 8.0 | NaOH | Slight tint. |

[1] MPTS is magnesium p-toluene sulfonate.

*Examples 33 and 34 (Table 3)*

These examples were carried out in substantially the same manner as Examples 1–18 above, except the HEC had a higher viscosity, namely 4600 cps. at 2% solids concentration.

Further details are given in Table 3 which follows.

TABLE 3 (EXAMPLES 33 AND 34)

| Ex. No. | Stabilizer | | pH of final solution | pH adjusted with— | Film color after baking |
|---|---|---|---|---|---|
| | Name | Percent | | | |
| 33 | None | None | 6.0 | HCl | Very light tan. |
| 34 | NaH$_2$PO$_4$.H$_2$O | 5 | 6.0 | NaOH | Slight tint. |

*Examples 35–37 (Table 4)*

These examples were carried out in substantially the same manner as Examples 1–18 above, except the HEC had a lower D.S. and its viscosity was 440 cps. at 6% solids concentration.

Further details are given in Table 4 which follows.

TABLE 4 (EXAMPLES 35–37)

| Ex. No. | Stabilizer | | pH of final solution | pH adjusted with— | Film color after baking |
|---|---|---|---|---|---|
| | Name | Percent | | | |
| 35 | None | None | 6.0 | HCl | Very dark brown. |
| 36 | NaH$_2$PO$_4$.H$_2$O | 2.5 | 6.0 | None | Light brown. |
| 37 | NaH$_2$PO$_4$.H$_2$O | 5.0 | 6.0 | ---do--- | Very light tan. |

*Examples 38–44 (Table 5)*

These examples were carried out in substantially the same manner as Examples 1–18 above. Examples 38 and 39 were carried out in order to determine whether or not the acid or alkali used to adjust the pH of the stabilized mixture had any effect on the stabilization of the mixtures. The purpose of Examples 40–44 was to carry this determination to a much further degree by adding various salts which conveivably could form during the pH adjustment.

Further details are given in Table 5 which follows.

TABLE 5 (EXAMPLES 38–44)

| Ex. No. | Stabilizer | | pH of final solution | pH adjusted with— | Film color after baking |
|---|---|---|---|---|---|
| | Name | Percent | | | |
| 38 | None | None | 6.0 | HCl | Dark brown. |
| 39 | ----do---- | None | 6.0 | H$_2$SO$_4$ | Do. |
| 40 | CH$_3$COONa | 5 | 6.0 | CH$_3$COOH | Very dark brown. |
| 41 | Na$_2$SO$_4$ | 5 | 6.0 | H$_2$SO$_4$ | Do. |
| 42 | NaCl | 5 | 6.0 | HCl | Do. |
| 43 | NaHSO$_3$ | 5 | 6.0 | NaOH | Do. |
| 44 | NaNO$_3$ | 5 | 6.0 | NaOH | Do. |

*Examples 45–47 (Table 6).—Stabilized CMC*

These examples were carried out in substantially the same manner as Examples 1–18 above using CMC instead of HEC.

Further details are given in Table 6 which follows.

TABLE 6 (EXAMPLES 45–47)

| Ex. No. | Stabilizer | | pH of final solution | pH adjusted with— | Film color after baking |
|---|---|---|---|---|---|
| | Name | Percent | | | |
| 45 | None | None | 6.0 | HCl | Very light tan. |
| 46 | NaH$_2$PO$_4$.H$_2$O | 2.5 | 6.0 | HCl | Do. |
| 47 | NaH$_2$PO$_4$.H$_2$O | 5.0 | 6.0 | HCl | Slight tint. |

*Examples 48–50 (Table 7).—Stabilized CMHEC–37*

These examples were carried out in substantially the same manner as Examples 1–18 above using CMHEC–37 instead of HEC.

The CMHEC–37 had a carboxymethyl D.S. of about 0.3 and a hydroxyethyl D.S. of about 0.7.

Further details are given in Table 7 which follows.

TABLE 7 (EXAMPLES 48–50)

| Ex. No. | Stabilizer | | pH of final solution | pH adjusted with— | Film color after baking |
|---|---|---|---|---|---|
| | Name | Percent | | | |
| 48 | None | None | 6.0 | HCl | Light brown. |
| 49 | NaH$_2$PO$_4$.H$_2$O | 2.5 | 6.0 | HCl | Very light tan. |
| 50 | NaH$_2$PO$_4$.H$_2$O | 5.0 | 6.0 | HCl | Do. |

*Examples 51 and 52 (Table 8).—Stabilized EHEC*

These examples were carried out in substantially the same manner as Examples 1–18 above, except ethyl hydroxyethyl cellulose (EHEC) was used instead of HEC and except that the films were baked 40 minutes at 400° F. The EHEC had an ethyl D.S. of 1.49 and a hydroxyethyl D.S. of 0.45. The EHEC had a viscosity of 230 cps. at 2% solids concentration.

Further details are given in Table 8 which follows.

TABLE 8 (EXAMPLES 51 and 52).—STABILIZED EHEC

| Ex. No. | Stabilizer | | pH of final solution | pH adjusted with— | Film color after baking |
|---|---|---|---|---|---|
| | Name | Percent | | | |
| 51 | None | None | 6.0 | HCl | Very light tan. |
| 52 | NaH$_2$PO$_4$.H$_2$O | 5 | 6.0 | NaOH | Slight tint. |

*Examples 53 and 54 (Table 9).—Stabilized Methyl Cellulose*

These examples were carried out in substantially the same manner as Examples 1–18 above except that methyl cellulose was used instead of hydroxyethyl cellulose and except that the films were baked for 40 minutes at 400°

F. The methyl cellulose had a viscosity of about 40 cps. at 2% solids concentration.

Further details are given in Table 9 which follows.

TABLE 9 (EXAMPLES 53 AND 54).—STABILIZED METHYL CELLULOSE

| Ex. No. | Stabilizer | | pH of final solution | pH adjusted with— | Film color after baking |
|---|---|---|---|---|---|
| | Name | Percent | | | |
| 53 | None | None | 6.0 | HCl | Very light tan. |
| 54 | NaH₂PO₄.H₂O | 5 | 6.0 | NaOH | Slight tint. |

The above examples show how one may obtain substantial benefits by practicing specific embodiments of the present invention. Many variations may be made in these embodiments within the scope of this invention and still realize the benefits thereof.

The above examples show that very small amounts of stabilizer are effective, that the amount of stabilizer used depends on a number of factors including the extent of stabilization desired, the stabilizer used, and the material being stabilized. In addition, the amount of stabilizer used will depend on the temperature to which the stabilized products are subjected in use. The examples show stabilizing with as little as 0.5% and as high as 10% stabilizer.

Although this invention has been described herein with particular reference to stabilizing cellulose ether film products, the invention is not limited thereto but is applicable to stabilizing cellulose ethers per se and cellulose ether products of all types. The compositions (i.e., the mixture comprising the cellulose derivative, stabilizer and solvent for the two) are particularly useful where it is desirable to lay down a deposit, coating or film and evaporate the solvent therefrom, and where the deposit, coating or film is subjected to high temperature during preparation or in subsequent use. In most cases water is the most practical solvent to use in these compositions. The term "films" in the claims hereof is intended to cover all such products embodied in "a deposit, coating or film."

Preferably, the cellulose derivatives which may be stabilized according to this invention are cellulose ethers and those of greatest interest are the water-soluble cellulose ethers because they are the ones most frequently used under conditions which are apt to cause undesirable discoloration. In view of this, it is preferred to use stabilizers which are also water soluble. These ethers include but are not limited to alkyl cellulose ethers, e.g. methyl cellulose; hydroxyalkyl cellulose ethers, e.g. hydroxyethyl cellulose, hydroxypropyl cellulose, hydroxybutyl cellulose; alkyl hydroxyalkyl cellulose ethers, e.g. ethyl hydroxyethyl cellulose; carboxyalkyl cellulose ethers, e.g. carboxymethyl cellulose, carboxyethyl cellulose; carboxyalkyl hydroxyalkyl cellulose ethers, e.g. carboxymethyl hydroxyethyl cellulose, carboxyethyl hydroxypropyl cellulose, carboxymethyl hydroxypropyl cellulose. However, usually there is more of a color problem with the hydroxyalkyl cellulose ethers than with the others.

All of these cellulose ethers are well known and various methods of manufacturing them are well known in the art.

In the manufacture of the cellulose ether compounds stabilized according to this invention, it is conventional practice to etherify in the presence of an alkali (often sodium hydroxide or potassium hydroxide) and to neutralize with an acid the portion of this alkali which remains after etherification. This neutralization, of course, produces a salt. In any case where the neutralization forms a stabilizer salt of this invention, such salt may be added by this indirect means within the scope of this invention.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patents is:

1. Process of making films of improved resistance to becoming discolored which comprises preparing a solution by dissolving in water (1) a water soluble cellulose ether selected from the group consisting of alkyl, carboxyalkyl, hydroxyalkyl, alkyl hydroxyalkyl and carboxyalkyl hydroxyalkyl ethers and, (2) a water soluble stabilizer selected from the group consisting of monosodium phosphate, disodium phosphate, calcium chloride, magnesium sulfate, potassium citrate, monopotassium phosphate, magnesium p-toluene sulfonate, aluminum sulfate, barium chloride, calcium nitrate and magnesium chloride, the amount of stabilizer being at least 1.0% by weight of the cellulose ether employed, casting films from said solution, and substantially drying the films.

2. Process of claim 1 wherein the cellulose ether is a hydroxyalkyl cellulose.

3. Process of claim 1 wherein the cellulose ether is hydroxyethyl cellulose and the stabilizer is monosodium phosphate.

4. Process of claim 1 wherein the cellulose ether is a carboxyalkyl cellulose.

5. Process of claim 1 wherein the cellulose ether is carboxymethyl cellulose and the stabilizer is monosodium phosphate.

6. Process of claim 1 wherein the cellulose ether is a carboxyalkyl hydroxyalkyl cellulose.

7. Process of claim 1 wherein the cellulose ether is carboxymethyl hydroxyethyl cellulose and the stabilizer is monosodium phosphate.

References Cited in the file of this patent

UNITED STATES PATENTS

| 2,445,374 | Van Wyck | July 20, 1948 |
| 2,535,363 | Koch | Dec. 26, 1950 |
| 2,579,755 | Pyle et al. | Dec. 25, 1951 |
| 2,768,143 | Henry | Oct. 23, 1956 |
| 2,899,315 | Williams et al. | Aug. 11, 1959 |

OTHER REFERENCES

Hercules: Cellulose Gum, 1949, page 10, Form 500–87A, 5M, 9-49, 57304.